United States Patent [19]

Gell et al.

[11] 4,000,360

[45] Dec. 28, 1976

[54] METHODS OF AND FURNACES FOR MELTING GLASS

[75] Inventors: Philip Anthony Maunsell Gell, Stourbridge; Douglas Graeme Hann, Shifnal, both of England

[73] Assignee: Elemelt Limited, London, England

[22] Filed: Sept. 5, 1975

[21] Appl. No.: 610,874

[30] Foreign Application Priority Data

Sept. 6, 1974 United Kingdom ............ 38938/74

[52] U.S. Cl. .................................................. 13/6
[51] Int. Cl.$^2$ ......................................... C03B 5/02
[58] Field of Search ................................... 13/6, 23

[56] References Cited

UNITED STATES PATENTS 2,975,224   3/1961   Burch ................................ 13/6 X

3,757,020   9/1973   Steitz ................................... 13/6

Primary Examiner—R. N. Envall, Jr.
Attorney, Agent, or Firm—Spencer & Kaye

[57] ABSTRACT

A furnace of the kind in which molten glass is heated by electrode means defining separate respective heating zones situated in horizontally spaced regions of the furnace chamber, glass being withdrawn along a withdrawal flow path extending between the heating zones to the outlet. Additional heating means is provided to heat the glass at a locality above the withdrawal flow path in the vicinity of the outlet, producing an upward convective pressure to counteract downward entrainment effects caused by flow of glass to the outlet.

15 Claims, 8 Drawing Figures

METHODS OF AND FURNACES FOR MELTING GLASS

BACKGROUND OF THE INVENTION

1. Field of the Invention

This invention relates to the production of molten glass, particularly a method of providing a supply of molten glass and to a glass melting furnace for use in the performance of the method, wherein heat is supplied to the glass by passage of alternating electric current therethrough.

2. Description of the Prior Art.

One of the problems encountered in methods of supplying molten glass and in glass melting furnaces therefor is that for a given glass composition and for a given throughput, i.e. tonnage to be withdrawn from the furnace over a given period, the glass in the furnace chamber is ideally maintained at or in the region of a specific temperature and undergoes heating in the chamber for or in the region of a specific residence time. It will be appreciated that for a given throughput the residence time is determined by the size of chamber.

In many instances it is required to supply molten glass at variable rates depending upon the nature of the glass utilisation process for which the glass is required and since it is not practicable to alter the volume of the furnace chamber, the variable demand for the supply of molten glass results in the glass being supplied, at different times, which has undergone different periods of residence in the furnace chamber.

In general the size of the furnace chamber will be determined by the maximum throughput which the furnace is required to handle, to ensure that the glass arriving at the point of use is in a satisfactorily refined condition. Thus, any variation in the rate of throughput is likely to be a reduction causing the glass to have a longer residence time in the furnace chamber than is ideal. When the residence time increases due to the reduced input, various undesirable effects occur.

Firstly, unless the temperature of the glass in the furnace is reduced, there is a reduction in the thickness of the blanket of solid state glass making material (normally termed "batch"). If the batch blanket is converted prematurely to the molten state, the heat insulating effect achieved by the presence of the batch blanket over a part or all of the surface of the chamber is lost. Furthermore, if the temperature of the glass in the furnace chamber is reduced, there is a risk of turbulence developing in the body of molten glass which, if it occurs, will tend to produce mixing of the solid state batch material into the body of melt rather than the slow simulation by melting from the underside of the batch blanket.

In addition, if part or all of the blanket is disrupted, then the ambient temperature in the space above the body of molten glass may rise to a level at which the life or satisfactory operation of the batch charger for spreading the batch onto the surface of the glass is impaired.

Accordingly, for throughputs less than the maximum for which the furnace is designed to handle, the temperature of the body of molten glass in the furnace chamber requires to be reduced.

Withdrawal of molten glass from the body is desirably effected in such a mode as to withdraw glass from the lower part of the molten body over as wide an area thereof as possible, and thus withdrawing means is preferably provided which brings about this result. For example, the withdrawal means may comprise an outlet in the lower part of one of the peripheral walls forming part of the lateral boundary of the moulten body of glass, and the bottom wall of the chamber containing such molten body of glass may afford a system of channels leading to the outlet and providing a withdrawal flow path which ensures withdrawal of glass from the lower part of the body over a wide area.

If the viscosity of the glass is lowered by a reduction of the temperature, the pattern of flow to the outlet is disturbed. In particular there is an increased tendency for portions of glass contained in the molten body and which lie adjacent to (especially above) the withdrawal flow path to become entrained into the withdrawal flow, whereas at the ideal operating temperature this would not be the case. Thus, there is a risk that insufficiently refined glass or glass containing particles of solid state batch material may be drawn into the withdrawal flow path particularly from a region adjacent to the surface of the glass and in the vicinity of the outlet.

The present invention has been developed primarily to meet the problem outlined above in a specific form of glass melting furance as disclosed in U.S. Pat Spec. No. 3,757,020. In the glass melting furnace therein disclosed electrode means provided in the chamber define respective heating zones situated in horizontally spaced regions of the chamber between which exists an intervening zone bounded partly by said heating zones and partly by portions of the upstanding peripheral wall of the chamber, and channel means defining a withdrawal flow path is formed in the bottom wall of the chamber. The channel means provide for withdrawal flow from the lower part of each of the heating zones towards the intervening zone, where the two opposing withdrawal flows meet, and from which a further withdrawal flow extends along the lower part of the intervening zone towards an outlet situated in the lower part of one of the peripheral wall portions which forms a boundary at the intervening zone.

When the furnace is operated to raise the temperature of the molten body of glass in the heating zones by the passage of electric current therethrough, and by conductive transference of heat in the intervening zone, to the ideal operating temperature or a temperature in the region thereof, glass withdrawal is as described from positions distributed over a wide area of the lower part of the body of molten glass and the withdrawn glass is replaced by generally descending glass in the furnace chamber itself replaced by melting from the underside of the batch blanket. The arrangement is especially advantageous in two respects. Firstly, if there is any entrainment of glass in the layers near the surface of the body with the withdrawal flow, the fact that withdrawal flow from the horizontally spaced heating zones takes place in opposed directions tends to produce a stationary pool of glass in the intervening zone, and thereby minimises destructive erosion of the peripheral walls of the furnace chamber especially in the vicinity of the outlet. Secondly, because the glass in the intervening zone is not itself directly traversed by the heating current but is heated by heat transfer from the horizontally spaced heating zones, the temperature thereof can be maintained at a value which is sufficient to provide the required melting from the underside of the batch blanket but which is not so high as to accentuate destructive erosion of the peripheral wall in the vicinity of the outlet due to any slight entrainment flow which may still exist.

If, however, the temperature of the glass in the furnace as a whole is lowered, not only is the carefully controlled pattern of withdrawal flow branches disrupted but the entrainment effect in the intervening zone tends to withdraw glass from the surface downwardly in the vicinity of the outlet.

SUMMARY OF THE INVENTION

It is one of the various objects of the present invention to provide a new or improved method of producing a supply of molten glass and a furnace therefor by means of which these disadvantageous effects may be avoided or reduced.

This invention provides a method of producing a supply of molten glass by the use of a furnace comprising a chamber for containing a body of molten glass and having a floor and upstanding side walls and an outlet positioned for withdrawing glass from the bottom of said chamber, and electrode means defining separate respective heating zones situated in horizontally spaced regions of the chamber, said chamber having open channel means in said floor defining a withdrawal flow path for the glass and including an outlet branch extending between said heating zones to said outlet, said method comprising the steps of (a) supplying solid state glass batch materials to cover the surface of a body of molten glass in the furnace chamber, (b) heating said body by the application of an alternating current to said electrode means, and (c) withdrawing glass along said withdrawal flow path and through said outlet, wherein the glass is heated at a locality above said withdrawal flow path to produce an upward convective pressure to counteract the downward pull exerted on such glass by the entrainment effect of flow along the withdrawal flow path.

Although generally applicable irrespective of the selected current paths for the primary current, the invention is especially applicable when general heating of said body is effected by passing a primary current through horizontally spaced regions which are separated by an intervening region bounded partly by the horizontally spaced regions and partly by peripheral wall portions of the furnace chamber and glass is withdrawn from said intervening region through an outlet in, or in the bottom wall adjacent to, one of said peripheral wall portions of said furnace chamber, said local heating being effected by passing an auxiliary electric current through glass contained in said intervening region in the vicinity of said outlet preferably at a locality immediately above the outlet.

This invention also provides a furnace for supplying molten glass and comprising a chamber for containing a body of molten glass and having a floor and upstanding side walls and an outlet positioned for withdrawing glass from the bottom of said chamber, primary electrode means defining separate respective heating zones situated in horizontally spaced regions of the chamber, said chamber having open channel means in said floor defining a withdrawal flow path for the glass and including an outlet branch extending between heating zones to said outlet, wherein auxiliary electrode means is provided and which is arranged to pass electric current locally through the glass above said withdrawal flow path in the vicinity of said outlet.

Preferably the furnace is associated with a supply circuit which includes means for regulating the current fed to said auxiliary electrode means relative to that fed to the primary electrode means.

The primary electrode means may be so arranged as to pass a primary electric current to each of two horizontally spaced heating zones between which exists an intervening region, the outlet being preferably situated in the lower part of one of the peripheral walls forming a lateral boundary of said intervening region or in the bottom wall adjacent thereto. Preferably the auxiliary electrode means comprising electrodes situated adjacent to said outlet for passing current through said intervening region at a locality immediately above said outlet.

The open channel means formed in the bottom wall may comprise a branch extending longitudinally of said intervening region, providing the outlet branch, and branches leading from said horizontally spaced regions towards the first said branch and communicating therewith.

For any of the foregoing arrangements the primary electrode means and the auxiliary electrode means may include one or more electrodes common to both of these means.

DETAILED DESCRIPTION OF THE PREFERRED EMBODIMENT.

Figure 1:
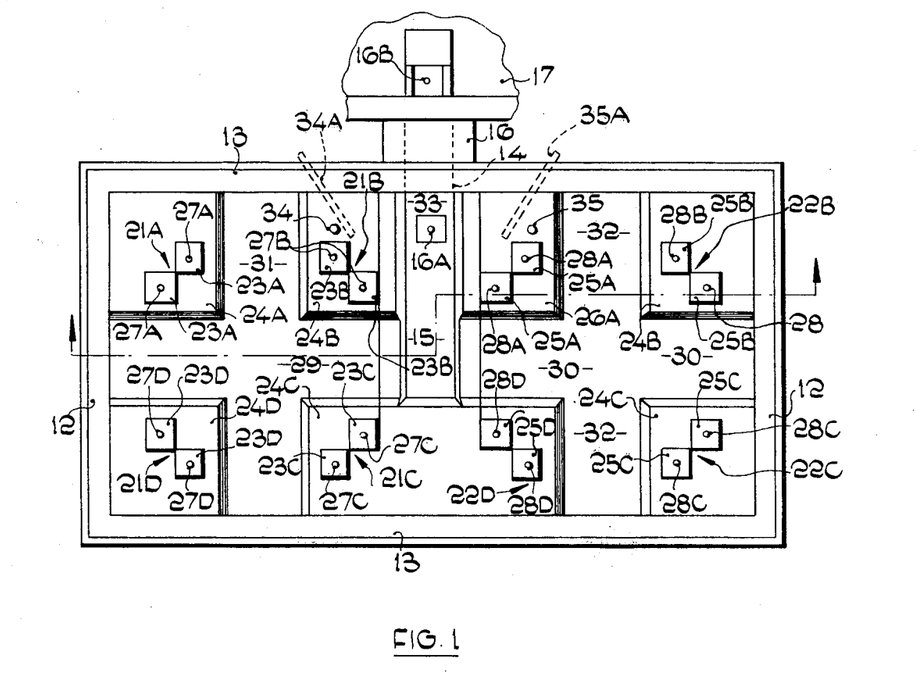
FIG. 1 is a plan view of one embodiment of furnace in accordance with the invention for carrying out the method thereof.
Figure 2:
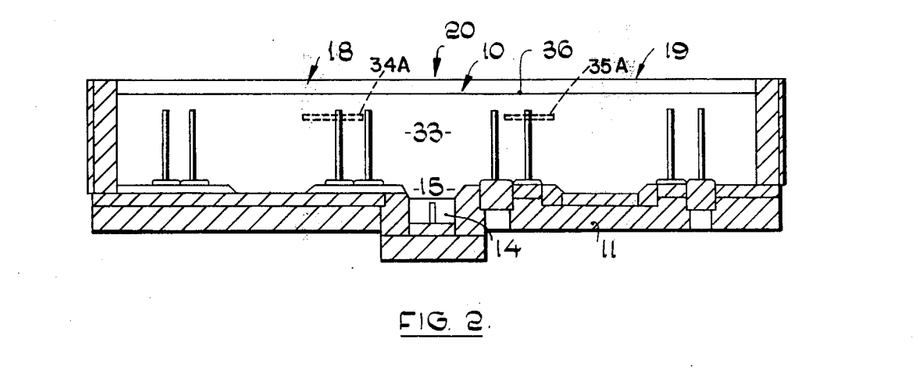
FIG. 2 is a view in side elevation and in cross-section on the line A—A of FIG. 1.

Referring firstly to FIGS. 1 and 2, the furnace illustrated therein is for supplying molten glass starting from solid state glass making materials, or batch.

The furnace comprises a chamber of generally rectangular form as see in plan and is defined by a bottom wall 11 and peripheral walls comprising two parallel end walls 12 and two parallel side walls 13.

For feeding glass out of the chamber a withdrawal means is provided comprising an outlet 14 which may be a rectangular opening formed partly in the lower part of one of the side walls 13 about midway along its length and partly as the end of a branch 15 of a system of channels formed in the bottom wall. It will be understood, however, that the outlet 14 could be formed wholly in the side wall 13 or wholly as an opening in the bottom wall 11 if desired.

The outlet 14 communicates with the interior of a duct 16 which leads to a further chamber 17.

A body of molten glass contained in the chamber 10 is subjected to heating and is supplied with fresh batch material of powdered or divided form distributed over the entire surface of the molten body of glass by means of a batch charger (not shown). The chamber 10 may be a melting chamber, that is to say a chamber of which the primary function is the conversion of the batch materials from the solid state to the molten state and the feeding of the molten glass out of the outlet 14 with only a small incidental amount of refining, that is to say liberation of gaseous content from the body of glass and conversion thereof to homogeneous form. Alternatively the chamber 10 may be a melting and refining chamber in which all the refining necessary is conducted. In the former event the chamber 17 may be a refining chamber, and in the latter event the chamber 17 may be a working chamber or forehearth from which glass is subsequently withdrawn for use as the working material in some associated machine or apparatus.

Glass in the chamber 10 is heated by primary electrode means in two horizontally spaced regions 18 and 19, there being an intervening region 20 opposite the outlet 14. In the regions 18 and 19 the glass is heated by the passage of alternating electric current therethrough between electrodes situated at the corners of square or rectangular figures. These electrodes may consist of single electrode elements or groups of electrode elements, each group comprising two or more electrode elements. One set of electrodes operative in the region 18 comprises electrodes 21A to 21D whilst a further similar set 22A to 22D is operative in the region 19.

Each of the electrode elements comprise vertical upstanding rods of molybdenum or other suitable electrically conductive material and extend, as seen in the case of electrode 21A, through blocks 23A, which in turn extend upwardly through a platform 24A. The equivalent blocks and platforms are provided for all the other electrode elements which serve to provide heating in the regions 18 and 19 with the blocks and platforms designated by the numeral 23 and 24 respectively with an appropriate suffix for the region 18 and designated 25 and 26 with an appropriate suffix for the region 19, the electrode elements themselves are designated by the reference 27 and an appropriate suffix for the region 18, and 28 with an appropriate suffix for the region 19.

Current may also be passed through the glass in the duct 16 between electrodes 16A and 16B situated respectively adjacent to opposite ends of such duct.

The resultant floor or bottom wall of the furnace chamber thus has a number of channels comprising the branch 15 already referred to and further branches defined by the platforms such as 24A, these being branches 29 and 30 which extend through the regions 18 and 19 respectively parallel to the side walls 13, and branches 31 and 32 in the regions 18 and 19 respectively which extend parallel to the end walls 12 and intersect with respective branches 29 and 30 to form cruciform channel systems leading, by way of the two inner end portions of the branches 29 and 30, to the channel branch 15 at a position centrally of the chamber.

The molten body of glass is heated by the passage of current (as hereinafter described) in the regions 18 and 19 between the electrodes provided respectively therein while the glass contained in the intervening region 20 is heated by heat transfer from the regions 18 and 19, this occurring partly by conduction and partly by flow of glass from the regions 18 and 19 into the region 20.

Withdrawal of glass takes place from the lower part of the body of glass, i.e. the region extending upwardly from the bottom wall of the furnace for a distance which may be from one quarter to one half the depth of glass therein, but which will vary according to the rate of withdrawal, such withdrawal being effected by flow along the various branches 15, 29, 30, 31 and 32 of the channel system.

For a given composition of glass and a given throughput, i.e. withdrawal rate through the outlet 14, there is an optimum temperature (represented by the average temperature in the three regions 18, 19 and 20) at which the furnace should be operated to ensure that the degree of refining which it is desired to carry out is effected in the chamber 10 and that the batch blanket is maintained over the entire surface of the glass without becoming unduly thin at any point or whilst maintaining the flow pattern on the lower part of the body of glass as defined by the channels.

Whilst there is some tolerance as to variation of this temperature below the optimum value, and to a lesser extent above the optimum value, dependent upon variation of the throughput below and above the predetermined value for which the furnace is designed, departure from this range, and more especially by way of reduction of temperature, will tend to disturb the pattern of flow along the withdrawal path defined by the branches of the channel system, and as a result there is a tendency for glass to be drawn downwardly into the outlet 14 from the upper part of the body of glass in the vicinity of the outlet, i.e. in the region marked 33.

To counteract this effect there is provided a means for creating an upthrust in the part of the glass disposed above the branch 15 in the region 33. Such upthrust is developed convectively by passing an auxiliary current through the part 33 of the glass. Such auxiliary current is preferably controlled relatively to, and separately from, control exercised over the magnitude of the primary alternating electric current traversing the glass in the regions 18 and 19 between the electrodes provided in these regions.

The magnitude of the auxiliary current may thus be adjusted to an optimum value which produces just sufficient heating in the part 33 and hence just sufficient convective upthrust or upward pressure to counterbalance the downward pull or entrainment effect which would otherwise cause glass to be drawn downwardly into the branch 15 from layers above the normal plane in which glass flows along the withdrawal network of channels.

For this purpose auxiliary electrodes conveniently in the form of vertical upwardly projecting electrode rods 34 and 35, may be provided, one on each side of the branch 15 of the channel system. Current will pass between these electrodes immediately above the upper end of the channel branch 15 in a zone extending continuously upwardly to a position adjacent to the normal glass level indicated at 36. Some current passing between the auxiliary electrodes 34, 35 may traverse the glass in the channel 15 but since the latter is travelling towards the outlet 14 such glass will be heated only for a short time period and the rise of temperature developed therein will be small compared with the rise of temperature developed in the relatively stagnant glass in the region 33.

Alternatively, or in addition, auxiliary electrodes may be disposed in horizontal (or possibly inclined) planes to project through the adjacent side wall 13 as indicated at 34a, 35a.

These may be disposed at a position in the mid region between the bottom wall and the normal glass level 36 or, as shown, somewhat nearer the latter.

Figure 3:
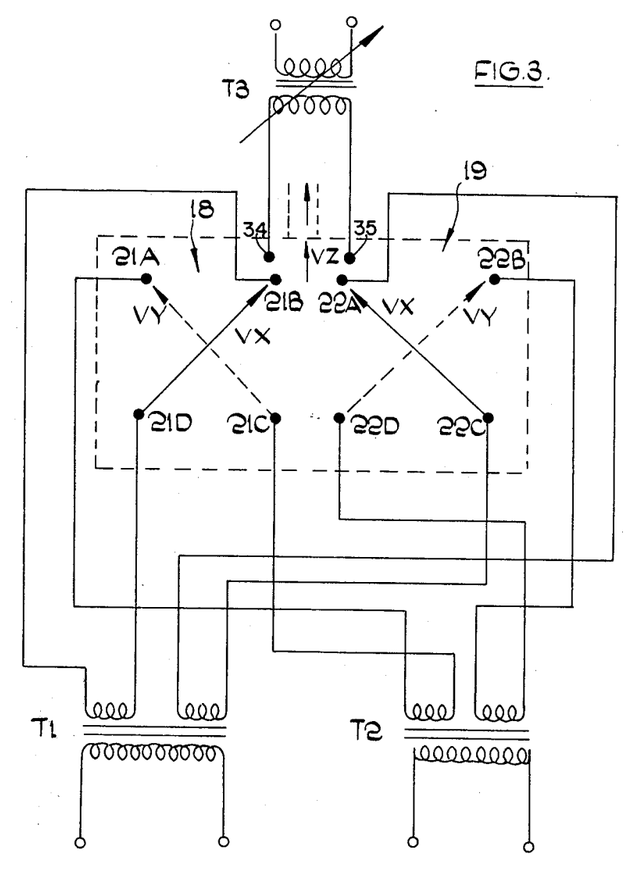
FIG. 3 is a diagrammatic view of the furnace of FIG. 1 illustrating the supply circuit.

One suitable supply circuit is illustrated in FIG. 3. In this a two-phase supply providing voltages in quadrature and designated X phase and Y phase are connected to the primary windings of transformers T1, T2, each of which has two secondary windings. One secondary winding of one transformer T1 and one secondary winding of the other transformer T2 are connected, as shown, across diagonally opposed electrodes 21D, 21B and 21C, 21A to develop X phase and Y phase voltages indicated vectorially at VX, VY in the region 18. Similarly phase voltages VX and VY are developed as shown between the electrodes in the region 19. It will thus be apparent that no voltage difference is developed between electrodes 21B and 22A and between electrodes 21C and 22D so that the only current traversing the glass in the region 33 is that established across electrodes 34, 35 and/or 34a, 35a.

This current may be supplied from the secondary winding of a third transformer T3, the primary winding of which is supplied from a separate voltage source designated Z phase which preferably has a leading phase angle with respect to VX and the lagging phase angle with respect to VY of 45° in each case. Transformer T3 may be a tap changing or other variable voltage transformer enabling the voltage VZ applied across the electrodes 34, 35 and/or 34a, 35a to be varied as required relatively to the phase voltages VX and VY.

Figure 4:
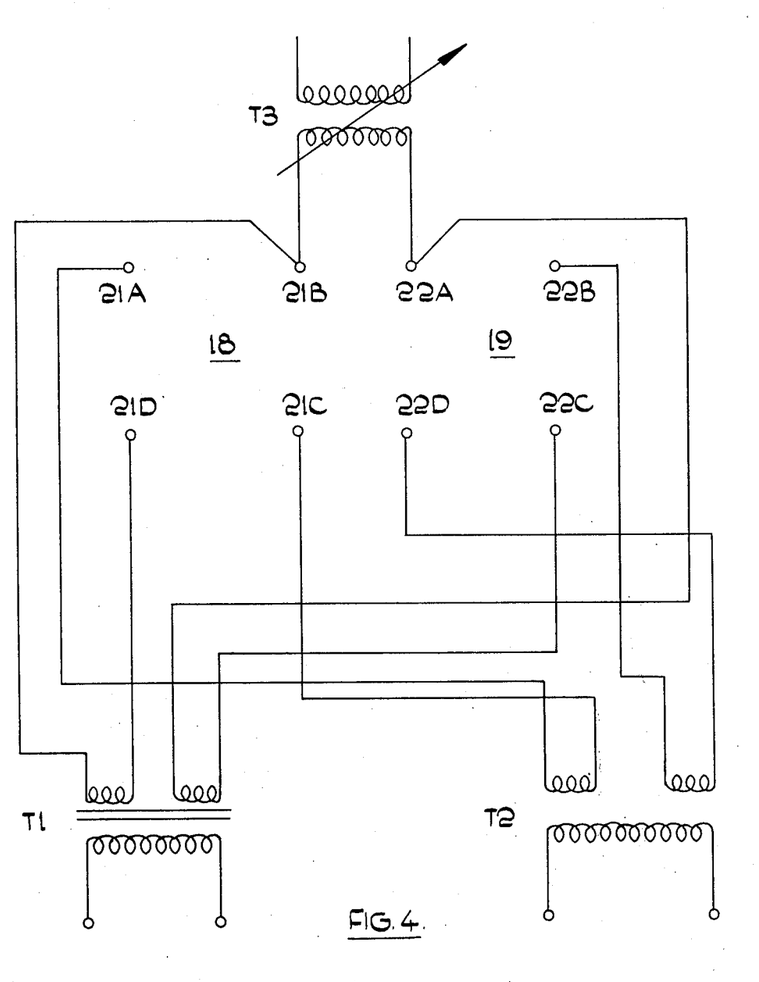
FIGS. 4 to 8 illustrate alternative forms of supply circuit which may be employed.

In the modification illustrated in FIG. 4, the separate auxiliary electrodes 34, 35 and 34a, 35a are omitted and the Z phase voltage is applied across electrodes 21B, 22A by the transformer T3. The supply of primary current to the electrodes for effecting general heating in the regions 18 and 19 is as shown in FIG. 3. It will be understood that utilisation of the electrode 21B and the electrode 22A for the purpose of transmitting the auxiliary current through the part 33 of the glass may be effected by utilising all of the electrode elements of 21A and all of the electrode elements of 22B, or a lesser number of the electrode elements, for example one or two out of three.

Figure 5:
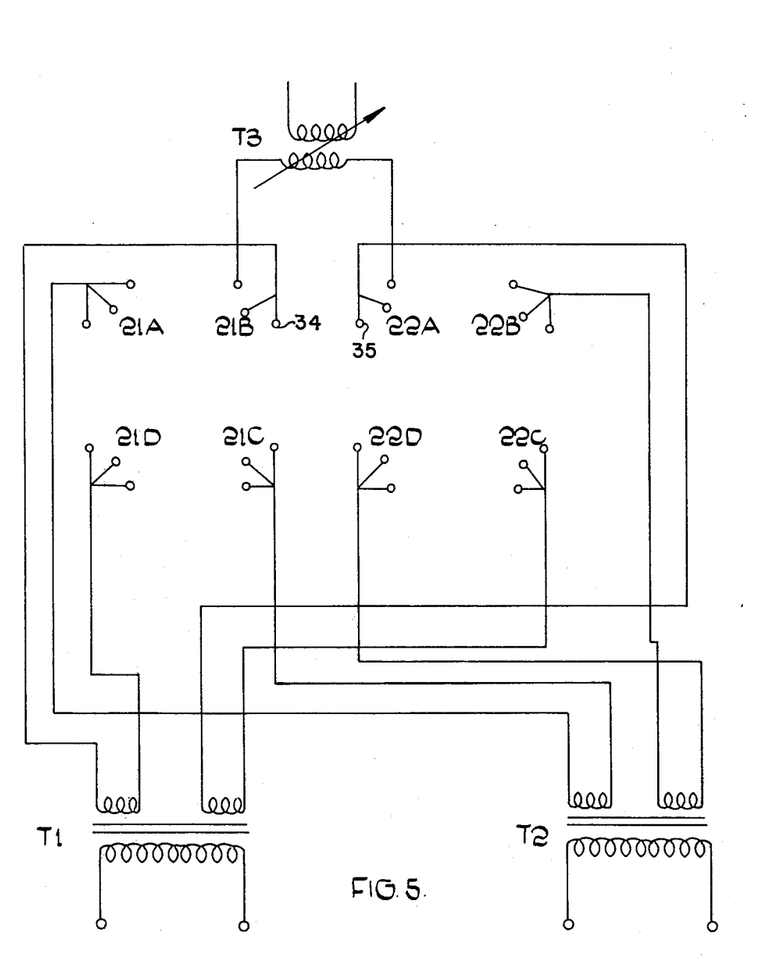

A further modification is illustrated in FIG. 5 in which the electrodes for transmitting the primary current to the regions 18 and 19 consist each of a group which normally contain three electrode elements. In respect of the electrodes 21B and 22A only two of the electrode elements are used as primary electrodes and are strapped electrically together. The third electrode element 34 and 35 (not strapped to the remaining two) is connected to the secondary winding of transformer T3. In other respects the supply circuit is as disclosed with respect to FIG. 3.

Figure 6:
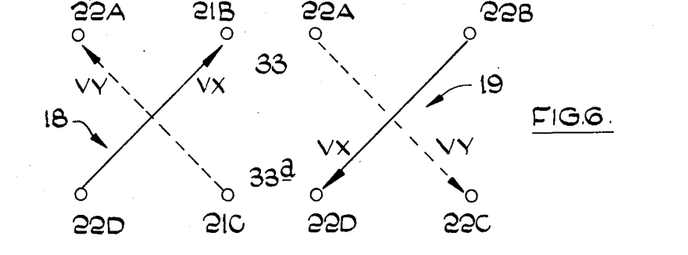

In a further modification illustrated in FIG. 6 the connection of diagonally opposed pairs of electrodes to respective secondary windings of transformers T1 and T2 is reversed in respect of those electrodes heating the region 19 compared with arrangement shown in FIG. 3 so that vectorially the phase voltage VX is applied between electrodes 22B and 22D while phase voltage VY is applied between electrodes 22A, 22C.

In consequence of this a voltage is developed across the part 33 of the glass above the channel branch 15 between electrodes 21B and 22A and also a voltage is developed between electrodes 21C and 22D so that current passes through the part of the glass at a level above the channel branch 15 but adjacent to the side wall 13 remote from the outlet 14. In this arrangement, as shown, the current passing through the part 33 and the further part indicated at 33a of the glass is not separately adjustable relatively to the main current traversing the regions 18 and 19.

Figure 7:
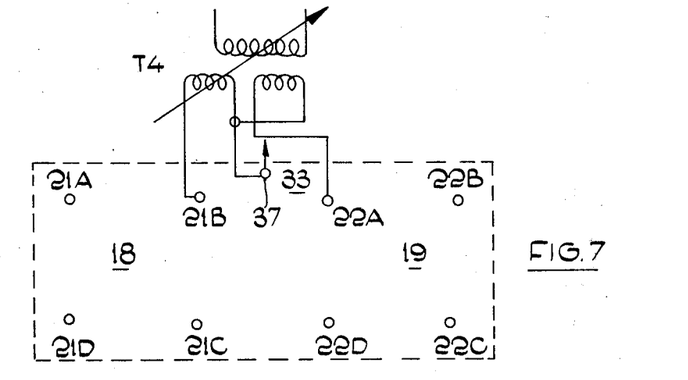

In the modification illustrated in FIG. 7 an auxiliary electrode 37 is provided at a position medially of the channel branch 15 and adjacent to the outlet 14 so as to lie in the region 33. The supply circuit includes a transformer T4 having respective secondary windings connected between this electrode 37 and electrodes 21B and 22A. This causes current to pass respectively from these electrodes to the electrode 37 through the region 33. The transformer T4 includes adjustment means enabling the voltages developed in the secondary windings to be varied relatively to the primary alternating voltages applied to the electrodes in the regions 18 and 19.

Figure 8:
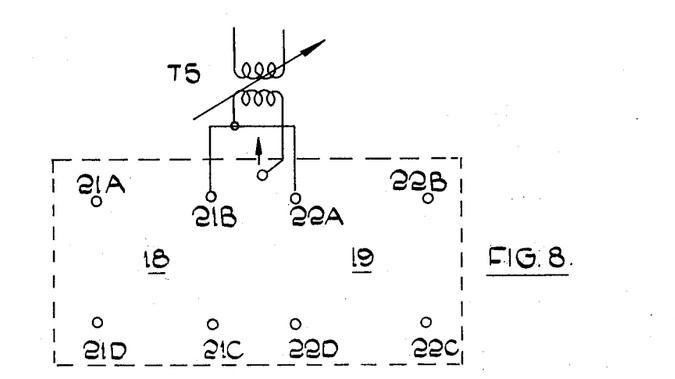

FIG. 8 illustrates yet another alternative which is similar to FIG. 7 but entails the use of a transformer T5 having a single secondary winding connected between the auxiliary electrode 37 and the two electrodes 21B, 22A strapped electrically together. The transformer T5, as also the transformer T4, would have its primary winding connected to a separate voltage source such as the Z phase previously mentioned.

In all of the foregoing embodiments of the invention it is to be understood that, instead of employing auxiliary electrodes in the form of single electrode elements, any or all of the auxiliary electrodes may comprise groups of electrode elements such as rods.

In all these cases the magnitude of the auxiliary current passing between the auxiliary electrodes may be adjusted to achieve the balance previously referred to between upwardly exerted convective pressure and downwardly exerted pull produced by the entrainment effect. Thus the pattern of withdrawal from the generally heated body of glass may be maintained over a much wider range of temperatures than heretofore, thereby permitting a furnace of a given size to be utilised satisfactorily over a wider range of throughputs.

We claim:
1. In a method of producing a supply of molten glass by the use of a furnace comprising a chamber for containing a body of molten glass and having a floor and upstanding side walls and an outlet positioned for withdrawing glass from the bottom of said chamber, and electrode means defining separate respective heating zones situated in horizontally spaced regions of the chamber, said chamber having open channel means in said floor defining a withdrawal flow path for the glass and including an outlet branch extending between said heating zones to said outlet, said method comprising the steps of (a) supplying solid state glass batch materials to cover the surface of a body of molten glass in the furnace chamber, (b) heating said body by the application of an alternating current to said electrode means, and (c) withdrawing glass along said withdrawal flow path and through said outlet, the improvement wherein the body of molten glass is heated at a locality above said withdrawal flow path adjacent to the outlet to produce an upward convective pressure to counteract the downward pull exerted on such glass by the entrainment effect of flow along the withdrawal flow path.

2. A method according to claim 1 wherein said electrode means is so positioned as to define an intervening zone between said heating zones and bounded partly by said heating zones and partly by at least one side wall portion of the furnace chamber.

3. A method according to claim 1 wherein said local heating is effected by passing an alternating electric current through glass contained in said intervening region in the vicinity of the outlet.

4. A method according to claim 3 wherein said alternating electric current is passed through glass at a locality immediately above the outlet.

5. A method according to claim 3 wherein said alternating electric current effecting said local heating is out of phase with the alternating current applied to the first said electrode means.

6. In a furnace for supplying molten glass and comprising a chamber for containing a body of molten glass and having a floor and upstanding side walls and an outlet positioned for withdrawing glass from the bottom of said chamber, and primary electrode means defining separate respective heating zones situated in horizontally spaced regions of the chamber, said chamber having open channel means in said floor defining a withdrawal flow path for the glass and including an outlet branch extending between heating zones to said outlet, the improvement wherein auxiliary electrode means is provided and which is arranged to pass electric current through the body of molten glass at a locality above said withdrawal flow path adjacent to of said outlet.

7. A furnace according to claim 6 comprising a supply circuit for connection to such primary and auxiliary electrode means and which comprises first transformer means connected to the primary electrode means, and second transformer means connected to the auxiliary electrode means.

8. A furnace according to claim 7 wherein the voltage applied to the first transformer means is out of phase with the voltage applied to the second transformer means.

9. A furnace according to claim 7 wherein the first transformer means applies a two-phase voltage to the primary electrode means.

10. A furnace according to claim 6 wherein the auxiliary electrode means utilises two electrodes of the primary electrode means to pass current locally through the glass above said withdrawal path in the vicinity of the outlet.

11. A furnace according to claim 10 wherein the auxiliary electrode means includes an auxiliary electrode between the two said electrodes of the primary electrode means, and transformer means connected across said two electrodes and said auxiliary electrode.

12. A furnace according to claim 7 wherein the supply circuit includes means for regulating the current fed to said auxiliary electrode means relative to that fed to the primary electrode means.

13. A furnace according to claim 6 wherein said primary electrode means are so positioned as to define an intervening zone between said heating zones and bounded partly by said heating zones and partly by at least one side wall portion of the furnace chamber.

14. A furnace according to claim 13 wherein the bottom wall is formed with channel means co-operating with said outlet to define the withdrawal means.

15. A furnace according to claim 14 wherein said channel means comprises a branch extending longitudinally of said intervening region and further branches extending from said horizontally spaced regions to the first said branch.

* * * * *